United States Patent
Mishima et al.

[11] 3,863,137
[45] Jan. 28, 1975

[54] EXCITING SYSTEM FOR ALTERNATOR

[75] Inventors: Nobuo Mishima; Takeshi Yamaguchi; Sozaburo Yoshizawa; Torao Kobayashi; Takashi Yamade, all of Hitachi, Japan

[73] Assignee: Hitachi, Ltd., Tokyo, Japan

[22] Filed: Aug. 17, 1973

[21] Appl. No.: 389,264

[30] Foreign Application Priority Data
Aug. 23, 1972 Japan............................ 47-83780

[52] U.S. Cl............... 322/25, 322/27, 322/28, 322/64, 322/87
[51] Int. Cl. ............................................. H02p 9/30
[58] Field of Search ............. 322/25, 27, 28, 63, 64, 322/86, 87

[56] References Cited
UNITED STATES PATENTS
2,862,174  11/1958  Hansen et al..................... 322/64 X
3,605,006  9/1971  Nagae et al....................... 322/25 X
3,758,843  9/1973  Ishizaki et al..................... 322/27 X Primary Examiner—J. D. Miller
Assistant Examiner—Robert J. Hickey
Attorney, Agent, or Firm—Craig & Antonelli

[57] ABSTRACT

An exciting system for a brushless alternator in which the field coil of an exciter has a double winding structure, and current is supplied to one of the field coil windings from a permanent magnet generator, while current proportional to the load current of the alternator is supplied to the other field coil winding through a current converter, so as to promote recovery of the output voltage against momentary fluctuations of the load, to improve the output waveform of the alternator, to protect the system against short-circuit trouble, and to reduce the size and weight of the brushless alternator set.

3 Claims, 2 Drawing Figures

EXCITING SYSTEM FOR ALTERNATOR

This invention relates to exciting systems for brushless alternators driven by drive means such as engines, water or steam turbines or electric motors, and more particularly to improvements in an exciting system for a brushless alternator used in a high voltage circuit.

In an alternator, d.c. power produced by a d.c. exciter is generally supplied to the field coil of the alternator thereby producing a.c. power in the armature coil of the alternator and this a.c. power is supplied to a load. The field coil of the alternator and the armature coil of the d.c. exciter are wound around the field core and armature core respectively fixedly mounted on the same rotary shaft which is driven by a drive means such as an engine or water turbine. The power induced in the armature coil of the d.c. exciter is a.c. power and this a.c. power cannot be directly supplied to the field coil of the alternator. Thus, a commutator is connected across the armature coil of the d.c. exciter and the commutator under rotation cooperates with brushes in contact therewith to commutate the a.c. power into d.c. power. The commutated current appears in the stator side due to the fact that the brushes are supported by a portion of the stator and are in sliding contact with the commutator. Thus, in order to supply d.c. power to the field coil which is supported on the rotor side of the alternator, another set of brushes must be disposed on the stator side and slip rings in rotary contact with the brushes must be mounted on the rotary shaft to be connected with the field coil.

Therefore, a commutating unit composed of a commutator and brushes and a current collecting unit composed of slip rings and brushes are required in order to attain power transmission and commutation between the armature coil of the d.c. exciter and the field coil of the alternator. This results in an increase in the number of parts of the alternator set and is disadvantageous in that not only the overall size of the alternator set is enlarged but also provision of the brushes in the commutating unit and collecting unit imposed restrictions on the demand for a larger capacity and high speed rotation of the alternator.

In an effect to eliminate the disadvantage above described, a so-called brushless alternator has been developed and put into practical use recently in which brushes in sliding contact with rotating parts are entirely unnecessary. In this brushless alternator, conventional commutating unit and collecting unit employing brushes are replaced by a rectifier which is composed of silicon or like solid rectifier elements and is mounted on a rotary shaft and the armature coil of an exciter is connected to the field coil of the alternator. Therefore, a.c. power produced in the armature coil of the exciter is convented into d.c. power by the solid rectifier mounted on the rotary shaft and the d.c. power thus obtained is supplied to the field coil of the alternator. This arrangement is advantageous in that transmission of current from the armature coil of the exciter to the field coil of the alternator and current conversion can be attained on the rotor side and the collecting unit and brushes for commutation, or in other words, electrical connections between the rotor and the stator can be eliminated thereby eliminating the previous limitations in the capacity and high speed rotation of the alternator due to the presence of the brushes. However, in the prior art alternator of this type, a battery and a change-over switch for initial excitation are essentially required resulting in various disadvantages as described later.

It is therefore an object of the present invention to provide an improved exciting system for a brushless alternator which eliminates the need for provision of the initial exciting circuit including the battery.

Another object of the present invention is to provide an exciting system for a brushless alternator which can continuously attain excitation even when the alternator terminals are short-circuited.

Still another object of the present invention is to provide an exciting system for a brushless alternator which is small in size and light in weight.

yet another object of the present invention is to provide an exciting system for a brushless alternator which can ensure satisfactory recovery of the output voltage of the alternator even when the output voltage may fluctuate momentarily.

The present invention is featured by the fact that a field coil of an alternator has a double winding structure, and power is supplied to one of the field coil windings from a permanent magnet generator, while power proportional to load current is supplied to the other field coil winding.

Other objects, features and advantages of the present invention will be apparent from the following detailed description in which a system according to the present invention is compared with a prior art system with reference to the accompanying drawings, in which.

Figure 1:
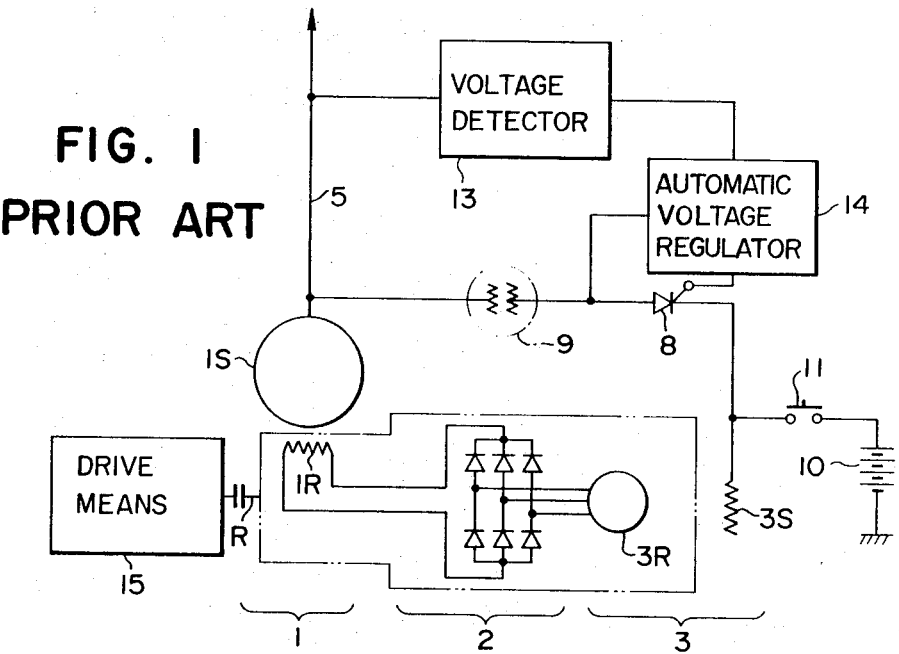
FIG. 1 is a circuit diagram of a prior art brushless alternator.

Referring to FIG. 1 showing a prior art brushless alternator presently in practical use, a field coil 1R of the alternator 1 is connected to an armature coil 3R of an exciter 3 through a rectifier 2 mounted on a rotary shaft R. The field coil 1R and armature coil 3R are mounted on the rotary shaft R together with the rectifier 2, and this rotary shaft R is driven by a drive means 15 such as a Diesel engine. A field coil 3S of the exciter 3 is disposed opposite to the armature coil 3R on the stator side and is connected to a battery 10 through a switch 11 to constitute an initial exciting circuit. The field coil 3S of the exciter 3 is further connected through a controlled rectifier 8 and a transformer 9 to an output line 5 connected to an armature coil 1S of the alternator 1 to constitute an exciting circuit for exciting the alternator 1 during steady operation.

The brushless alternator 1 having such a structure can generate electric power in a manner as described below. In operation, the drive means 15 which may be a Diesel engine is driven for causing rotation of the field coil 1R, rectifier 2 and armature coil 3R. In such a state, however, no a.c. power is produced in the armature coil 3R, and therefore, power for energizing the field coil 3S cannot be derived from the output line 5 connected to the armature coil 1S of the alternator 1. In order to energize the field coil 3S, the switch 11 in the initial exciting circuit is turned on to supply energizing power to the field coil 3S from the battery 10. A.c. power is induced in the armature coil 3R and is then rectified by the rectifier 2 to be converted into d.c. power. This d.c. power excites the field coil 1R of the alternator 1 and a.c. power is induced in the armature coil 1S to be supplied to a load by way of the output line 5. Thus, current flows through the output line 5 and energizing power can be supplied to the field coil 3S of the exciter 3 from the output line 5. More precisely, a.c. power appearing in the output line 5 is converted into d.c. power by the controlled rectifier 8 and this d.c. power is supplied to the field coil 3S. Therefore, the exciter 3 continues exciting operation and the alternator 1 can be operated steadily even when the switch 11 in the initial exciting circuit is turned off to stop the supply of power from the battery 10. The energizing voltage supplied from the output line 5 to the field coil 3S of the exciter 3 must be suitably reduced by the transformer 9. When the alternator output voltage is especially high, this transformer 9 must have a large capacity.

For the purpose of regulation of the output voltage of the alternator 1, a voltage detector 13 is connected to the output line 5 for detecting the output voltage, and an automatic voltage regulator 14 is connected to the voltage detector 13 for regulating the output voltage. The control angle of the controlled rectifier 8 is suitably adjusted to control the energizing power supplied to the field coil 3S of the exciter 3 so that the output voltage of the alternator 1 can be maintained constant.

The brushless alternator presently put into practical use has the following defects: In the first place, the initial exciting circuit including the battery 10 and switch 11 is essentially required. One of the disadvantages resulting from the provision of the initial exciting circuit resides in the point that the initial exciting circuit must be switched over to the steady exciting circuit after the alternator 1 is started and an operator or a suitable means replacing the operator must be provided for carrying out this circuit switch-over operation. Further, the battery 10 has a limited service life and this service life varies considerably depending on the conditions of surroundings including weather and place of installation. Thus, frequent maintenance and inspection is required. Furthermore, this battery 10 is considerably heavy and occupies a large space, and this is contradictory to the demand for reductions in the size and weight of the alternator set especially when the brushless alternator is designed to be transportable from one place to another. Reductions in the size and weight of the alternator set is a very important problem, but the size of the transportable alternator set may be increased against the demand due to, for example, the height and width of the battery supporting frame. Another disadvantage of the provision of the initial exciting circuit resides in the point that instantaneous supply of power is delayed by the period of time required for actuation of the initial exciting circuit when the alternator serves, for example, as an emergency power supply.

Secondly, no energizing current flows through the field coil 3S of the exciter 3 and sustained short-circuit current does not flow when a short-circuit occurs in the load circuit, that is, when a short-circuit occurs in the portions including the output line 5 and load. Due to the fact that no sustained short-circuit current appears, the protective relay disposed in the circuit does not operate and its protecting action cannot be attained in spite of occurrence of the short-circuit.

Thirdly, the transformer 9 interposed between the output line 5 and the field coil 3S of the exciter 3 must be of the high voltage type especially when the brushless alternator 1 is designed to produce a high output voltage. This high voltage transformer 9 is heavy in weight and large in size thereby increasing the overall size of the brushless alternator set. The overall size of the brushless alternator set is considerably increased since the supporting frame for the battery 10 has a considerable size as described above. This problem may be solved by eliminating the transformer 9 and deriving energizing power for the field coil 3S from the output line 5 through a current converter. However, provision of such current converter in place of the transformer 9 in the alternator set shown in FIG. 1 is not advisable since energizing current cannot be obtained during operation of the alternator under no load.

Fourthly, the prior art alternator is defective in that the output voltage subjected to momentary fluctuations cannot be satisfactorily recovered to the original level. The response of the exciting circuit in the alternator is such that a momentary drop in the output voltage is detected by the voltage detector 13 and the automatic voltage regulator 14 acts to increase the energizing current supplied to the field coil 3S of the exciter 3. Thus, the response is inevitably delayed by the period of time required for the voltage detector 13 to detect such a drop in the output voltage and this delay results in slow recovery of the output voltage to the original level. Further, this may result in stalling of the load which may be an induction motor and in release of the electromagnetic contactor.

An improved brushless alternator having an exciting system embodying the present invention will now be described in detail with reference to FIG. 2.

Figure 2:
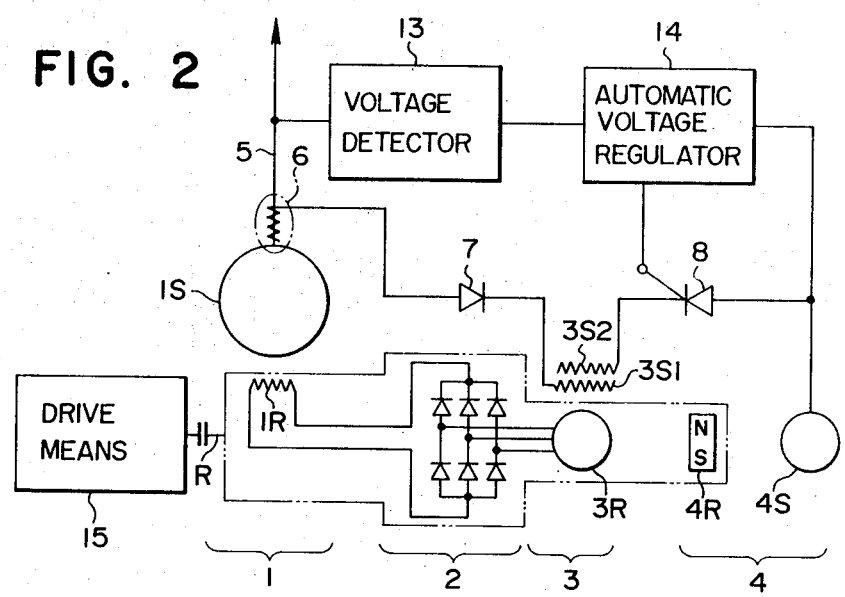
FIG. 2 is a circuit diagram of a brushless alternator equipped with an exciting system embodying the present invention.

The brushless alternator shown in FIG. 2 is broadly composed of an alternator 1, a rectifier 2, an exciter 3 and a drive means 15. The alternator 1 includes a field coil 1R wound around a field core fixedly mounted on a rotary shaft R and an armature coil 1S wound around an armature core suitably spaced from the field core to define an air gap therebetween. The rectifier 2 is fixedly mounted on the rotary shaft R and is composed of a plurality of silicon or like rectifier elements arranged and connected so as to convert a.c. power into d.c. power. The exciter 3 includes an armature coil 3R wound around an armature core fixedly mounted on the rotary shaft R end two field coil windings 3S1 and 3S2 wound around a field core suitably spaced from the armature core to define an air gap therebetween. The rotary shaft R having the field coil 1R, rectifier 2 and armature coil 3R fixedly mounted thereon is driven by the drive means 15 which may be a Diesel engine, gasoline engine, water turbine, steam turbine or electric motor. The rectifier 2 is electrically connected at its a.c. side to the terminals of the armature coil 3R of the exciter 3 and its d.c. side to the terminal of the field coil 1R of the alternator 1. The exciting system according to the present invention is provided with a permanent magnet generator 4. This permanent magnet generator 4 includes a permanent magnet rotor 4R fixedly mounted on the rotary shaft R and an armature coil 4S wound around an armature core suitably spaced from the rotor 4R to define an air gap therebetween.

An output line 5 leading to a load is connected to the terminal of the armature coil 1S of the alternator 1. A current converter 6 is disposed in this output line 5 for supplying to the field coil winding 3S1 of the exciter 3 a current which is proportional to the load current. This current converter 6 is connected to the field coil winding 3S1 through a rectifier 7 so that the a.c. output of the current converter 6 can be converted into d.c. power which is supplied to the field coil winding 3S1.

The armature coil 4S of the permanent magnet generator 4 is connected at the terminal thereof to the field coil winding 3S2 of the exciter 3 through a controlled rectifier 8 so that a.c. power derived from the armature coil 4S of the permanent magnet generator 4 can be converted into d.c. power which is supplied to the field coil winding 3S2.

A voltage detector 13 is connected to the output line 5 and an automatic voltage regulator 14 is connected to the voltage detector 13. The automatic voltage regulator 14 is electrically connected across the gate and anode of the controlled rectifier 8.

During operation of the alternator 1 under no load, a.c. power generated by the permanent magnet generator 4 is converted into d.c. power by the controlled rectifier 8 and this d.c. power is supplied to the field coil winding 3S2 of the exciter 3. A.c. power produced in the armature coil 3R of the exciter 3 is supplied through the rectifier 2 to the field coil 1R of the alternator 1 for inducing voltage in the armature coil 1S.

During loaded operation of the alternator 1, current proportional to the load current flowing through the output line 5 is derived from the current converter 6 and this a.c. power is converted into d.c. power by the rectifier 7 to be supplied to the field coil winding 3S1 of the exciter 3.

Therefore, the two field coil windings 3S1 and 3S2 of the exciter 3 are energized during the loaded operation of the alternator 1. In other words, the field coil of the exciter 3 is energized by two kinds of power, that is, the power derived from the current converter 6 and the power derived from the permanent magnet generator 4. Before the output voltage appears from the alternator 1, the situation is the same as that in the case of no-load operation.

Any fluctuation in the output voltage of the alternator 1 is detected by the voltage detector 13 and the automatic voltage regulator 14 responds to the output of the voltage detector 13 to apply a gate control signal to the controlled rectifier 8 for automatically controlling the control angle of the controlled rectifier 8 thereby regulating the output voltage of the alternator 1.

Suppose that a short-circuit occurs in the portions leading from the alternator 1 to the load. In the prior art exciting system in which energizing voltage is derived directly from the alternator terminal or through a current converter, power cannot be supplied to the exciting coil due to disappearance of the output voltage of the alternator resulting in step-out of the alternator from the system and the alternator cannot be placed in operation even when the short-circuit trouble is remedied. In the present invention, however, the alternator does not step out of the system and can be immediately placed in operation when the short-circuit trouble is remedied due to the fact that energizing current proportional to short-circuit current can be supplied to the field coil winding 3S1 through the current converter 6 during the short-circuited period, that is, sustained current flows in spite of the short-circuit of the alternator terminal.

Further, due to the fact that the alternator can be immediately placed in operation in response to recovery of the output voltage after elimination of the source of the short-circuit trouble, the automatic voltage regulator 14 can be immediately energized to apply the gate control signal to the controlled rectifier 8 for controlling the conduction of the controlled rectifier 8. The controlled rectifier 8 regulates the supply of energizing power from the permanent magnet generator 4 to the field coil winding 3S2 which cooperates with the field coil winding 3S1 energized by the power supplied from the current converter 6 so that the output voltage of the alternator 1 can be recovered instantaneously.

Further, by virtue of the fact that the permanent magnet generator 4 is provided for carrying out initial excitation, the battery which requires frequent maintenance and inspection is unnecessary, and therefore, the initial exciting circuit can be left maintenance-free over a long period of time. The size and weight of the alternator set can be greatly reduced due to the fact that the permanent magnet generator 4 is light in weight compared with the battery and the transformer for supplying energizing power to the field coil winding 3S1 is replaced by the current converter 6 which is light in weight and small in size. By way of example, an approximate reduction of 20 percent in weight could be attained with an alternator set according to the present invention when compared with a prior art alternator set of the same capacity.

It will be understood from the foregoing description that the present invention provides an exciting system for an alternator in which a field coil of an exciter has a double winding structure, and d.c. power is supplied to one of the field coil windings from a permanent magnet generator, while d.c. power proportional to the output voltage of the alternator is supplied to the other field coil winding through a current converter. This arrangement is advantageous in that energizing power can be continuously supplied even in the case of a short-circuit of the alternator terminal and the output voltage subject to momentary fluctuations can be substantially immediately recovered. The exciting system according to the present invention is further advantageous in that a high voltage transformer for obtaining energizing power is unnecessary and the initial exciting circuit including the battery can be eliminated. Thus, the alternator set is smaller in size and lighter in weight than hitherto and the exciting circuit can be left maintenance-free over a long period of time since it does not include the battery which requires frequent maintenance and inspection.

What we claim is:

1. An exciting system for a brushless alternator comprising an exciter having an armature coil and a field coil, rectifier means mounted on a rotary shaft for converting a.c. power produced by said exciter into d.c. power, and means for supplying said d.c. power to a field coil of said alternator for deriving an output voltage from an armature coil of said alternator, wherein said field coil of said exciter has a double winding structure including two field coil windings, a permanent magnet generator, a current converter, a rectifier connected to the output terminal of said permanent magnet generator for supplying d.c. power to one of said two field coil windings, and another rectifier connected to the output terminal of said current converter for supplying d.c. power proportional to the output voltage of said alternator to the other said field coil winding.

2. An exciting system for a brushless alternator having an armature coil and a field coil, comprising an exciter having an armature coil and a field coil, first rectifier means, a permanent magnet generator having an armature coil and a permanent magnet rotor, a rotary shaft driven by drive means and having said field coil of said alternator, said first rectifier means, said armature coil of said exciter and said permanent magnet rotor of said permanent magnet generator fixedly mounted thereon, said armature coil of said exciter being connected to said field coil of said alternator through said first rectifier means, a current converter said field coil of said exciter being divided into two coil windings one of which is connected through a controlled rectifier to the terminal of said armature coil of said permanent magnet generator and the other of which is connected through second rectifier means to a current converter disposed in an output line connected to the terminal of said armature coil of said alternator, a voltage detector connected to said output line, and a voltage regulator responsive to the output of said voltage detector for controlling the conduction of said controlled rectifier.

3. An exciting system for a brushless alternator having an armature coil and a field coil, comprising an exciter having an armature coil and a field coil, rectifier means mounted on a rotary shaft for converting a.c. power produced by said exciter into d.c. power, and means for supplying said d.c. power to the field coil of said alternator for deriving an output voltage from the armature coil of said alternator, wherein said field coil of said exciter has a double winding structure including two field coil windings, a permanent magnet generator is provided, which is connected to and serves as a power source for one of said two field coil windings, and a current converter for obtaining a.c. power proportional to the output voltage of said alternator is provided, which is connected to and serves as a power source for the other of said field coil windings.

* * * * *